United States Patent
Matsumoto (10) Patent No.: US 11,038,339 B2
(45) Date of Patent: Jun. 15, 2021

(54) ANOMALY DIAGNOSIS DEVICE AND ANOMALY DIAGNOSIS METHOD FOR OIL-HYDRAULIC OPERATING MECHANISM

(71) Applicant: Mitsubishi Electric Corporation, Tokyo (JP)

(72) Inventor: Daigo Matsumoto, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/758,303

(22) PCT Filed: Nov. 17, 2017

(86) PCT No.: PCT/JP2017/041444
§ 371 (c)(1),
(2) Date: Apr. 22, 2020

(87) PCT Pub. No.: WO2019/097668
PCT Pub. Date: May 23, 2019

(65) Prior Publication Data
US 2020/0321771 A1      Oct. 8, 2020

(51) Int. Cl.
*F15B 19/00* (2006.01)
*H02H 5/08* (2006.01)
(Continued)

(52) U.S. Cl.
CPC .............. *H02H 5/08* (2013.01); *F15B 19/005* (2013.01); *H02H 1/0007* (2013.01); *F15B 15/20* (2013.01); *H01H 33/34* (2013.01)

(58) Field of Classification Search
CPC ....... F15B 15/20; F15B 19/005; H01H 33/34; H02H 5/08
See application file for complete search history.

(56) References Cited

U.S. PATENT DOCUMENTS

| 5,748,077 | A | * | 5/1998 | Brandt | B60T 11/323 340/450 |
| 2013/0199619 | A1 | * | 8/2013 | Naquin | F15B 19/005 137/12 |
| 2016/0258452 | A1 | * | 9/2016 | Baldys | B60P 1/162 |

FOREIGN PATENT DOCUMENTS

| JP | H0554760 A |   | 3/1993 |
| JP | 2013193803 A | * | 9/2013 |

OTHER PUBLICATIONS

International Search Report (PCT/ISA/210) dated Jan. 30, 2018, by the Japan Patent Office as the International Searching Authority for International Application No. PCT/JP2017/041444.

(Continued)

*Primary Examiner* — Thomas E Lazo
(74) *Attorney, Agent, or Firm* — Buchanan Ingersoll & Rooney PC (57) ABSTRACT

An anomaly diagnosis device diagnoses anomaly of an oil-hydraulic operating mechanism that controls opening and closing of a circuit breaker. The anomaly diagnosis device includes: a first counter, which is a counter that counts the number of times of a pressure-increasing operation started upon a decrease in a hydraulic pressure maintained in the oil-hydraulic operating mechanism to a first reference pressure, and stopped upon an increase in the hydraulic pressure to a second reference pressure; a timer that measures an operation interval that is a time period from when a pressure-increasing operation is stopped until a next pressure-increasing operation is started; and an anomaly determiner that corrects, based on the operation interval, the number of pressure-increasing operations obtained based on a result of counting by the counter, and determines presence or absence of an anomaly in the oil-hydraulic operating mechanism using the corrected data of the number of pressure-increasing operations.

7 Claims, 6 Drawing Sheets

(51) Int. Cl.
*H02H 1/00* (2006.01)
*F15B 15/20* (2006.01)
*H01H 33/34* (2006.01)

(56) References Cited

OTHER PUBLICATIONS

Written Opinion (PCT/ISA/237) dated Jan. 30, 2018, by the Japan Patent Office as the International Searching Authority for International Application No. PCT/JP2017/041444.

* cited by examiner

|  | JANUARY | FEBRUARY | MARCH | APRIL | MAY |
|---|---|---|---|---|---|
| NUMBER OF SAMPLES | 31 | 28 | 31 | 30 | 31 |
| MEAN | 0.81 | 0.82 | 0.89 | 0.92 | 1.02 |
| VARIANCE | 0.14 | 0.14 | 0.14 | 0.13 | 0.14 |

FIG.6

|  | JANUARY | FEBRUARY | MARCH | APRIL | MAY |
|---|---|---|---|---|---|
| DEGREE OF FREEDOM | - | 57 | 60 | 59 | 60 |
| SAMPLE VARIANCE | - | 0.14 | 0.14 | 0.14 | 0.14 |
| t-VALUE | - | -0.13 | -0.87 | -1.16 | -2.21 |
| 2.5TH AND 97.5TH PERCENTILES | - | ±2.002 | ±2.000 | ±2.001 | ±2.000 |
| DIAGNOSIS RESULT | - | NORMAL | NORMAL | NORMAL | FAULTY |

ANOMALY DIAGNOSIS DEVICE AND ANOMALY DIAGNOSIS METHOD FOR OIL-HYDRAULIC OPERATING MECHANISM

FIELD

The present invention relates to an anomaly diagnosis device and to an anomaly diagnosis method for diagnosing anomaly of an oil-hydraulic operating mechanism.

BACKGROUND

An oil-hydraulic operating mechanism that oil-hydraulically controls opening and closing of a circuit breaker may fail to normally operate the circuit breaker upon occurrence of an anomaly that causes a decrease in hydraulic pressure. An anomaly diagnosis device for diagnosing anomaly of an oil-hydraulic operating mechanism is required to be capable of detecting an anomaly that has occurred in an oil-hydraulic operating mechanism at an early stage in the occurrence of the anomaly.

Patent Literature 1 discloses a technology for a monitoring device for detecting an anomaly of an oil-hydraulic operating mechanism based on a combination of operational information of the oil-hydraulic pump and operational information of the circuit breaker. The oil-hydraulic pump operates not only for operation of the circuit breaker, but also for increasing the hydraulic pressure that has decreased due to so-called slow leak that intentionally allows accumulator-pressurized oil to leak at a very low rate. In addition to the slow leak that allows oil to leak at a constant rate, an anomaly of oil leakage from piping will cause an oil-hydraulic pump to be driven more frequently to compensate the decrease in the hydraulic pressure caused by the oil leakage. The monitoring device of Patent Literature 1 recognizes how the oil-hydraulic pump is operating during operation of the circuit breaker, and thus monitors the oil-hydraulic pump for a change in the number of operations to detect an anomaly of the oil-hydraulic operating mechanism.

CITATION LIST

Patent Literature

Patent Literature 1: Japanese Patent Application Laid-open No. H05-54760

SUMMARY

Technical Problem

The accumulator is filled with nitrogen gas, which is a gas used for maintaining the hydraulic pressure. Operation of the oil-hydraulic pump causing the hydraulic pressure to increase, followed by an increase in the temperature around the accumulator may cause expansion or contraction of the nitrogen gas in the accumulator due to the temperature change, and may thus change the hydraulic pressure. A change in the hydraulic pressure results in a change in the amount of oil leakage caused by the slow leak. The technology of Patent Literature 1 is based on an assumption that the amount of oil leakage caused by the slow leak is constant in calculation of the number of operations of the oil-hydraulic pump. This may cause the calculated number of operations to deviate from the actual number of operations.

The technology of Patent Literature 1 may result in a delayed detection of a minor anomaly due to a deviation of the calculated number of operations from the actual number of operations, thereby presenting a problem in that there is difficulty in detection of an anomaly at an early stage in occurrence of an anomaly when the anomaly is still minor.

The present invention has been made in view of the foregoing, and it is an object of the present invention to provide an anomaly diagnosis device for an oil-hydraulic operating mechanism capable of detecting an anomaly of the oil-hydraulic operating mechanism at an early stage.

Solution to Problem

To solve the problem and achieve the object described above, an anomaly diagnosis device for an oil-hydraulic operating mechanism according to the present invention diagnoses anomaly of an oil-hydraulic operating mechanism that controls opening and closing of a circuit breaker. The anomaly diagnosis device according to the present invention includes: a counter that counts a number of times of a pressure-increasing operation started upon a decrease in a hydraulic pressure maintained in the oil-hydraulic operating mechanism to a first reference pressure, and stopped upon an increase in the hydraulic pressure to a second reference pressure; and a timer that measures an operation interval that is a time period from when a pressure-increasing operation is stopped until a next pressure-increasing operation is started. The anomaly diagnosis device according to the present invention includes an anomaly determiner that corrects, based on the operation interval, a number of pressure-increasing operations obtained based on a result of counting by the counter, and determines presence or absence of an anomaly in the oil-hydraulic operating mechanism using data of the number of pressure-increasing operations that has been corrected.

Advantageous Effects of Invention

The present invention provides an advantage in being capable of detecting an anomaly of an oil-hydraulic operating mechanism at an early stage.

DESCRIPTION OF EMBODIMENT

An anomaly diagnosis device and an anomaly diagnosis method for an oil-hydraulic operating mechanism according to an embodiment of the present invention will be described in detail below with reference to the drawings. Note that this embodiment is not intended to limit the scope of this invention.

First Embodiment

Figure 1:
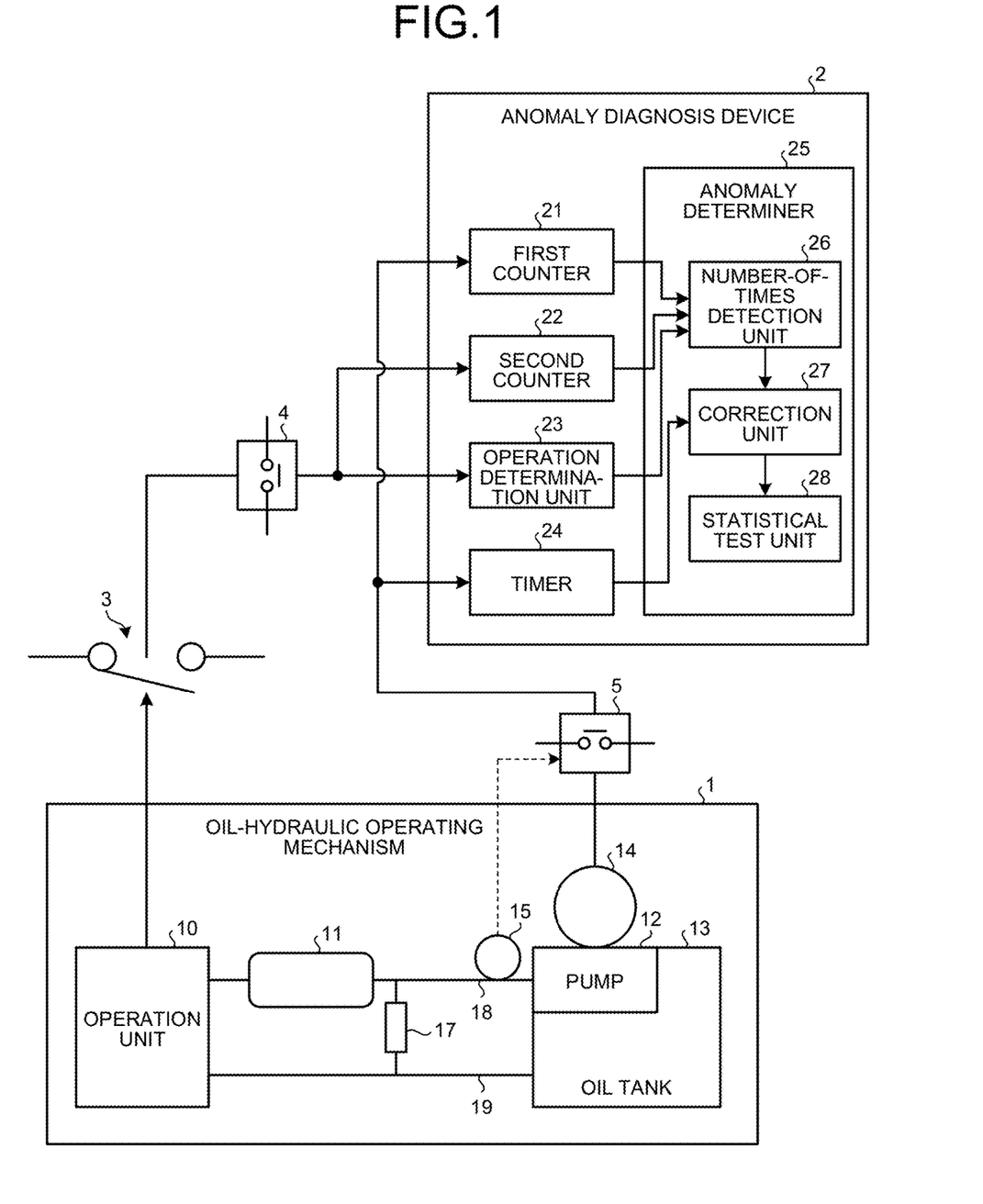
FIG. 1 is a diagram illustrating an anomaly diagnosis device for an oil-hydraulic operating mechanism according to a first embodiment of the present invention.

FIG. 1 is a diagram illustrating an anomaly diagnosis device for an oil-hydraulic operating mechanism according to a first embodiment of the present invention. An oil-hydraulic operating mechanism 1 oil-hydraulically controls opening and closing of a circuit breaker. An anomaly diagnosis device 2 diagnoses anomaly of the oil-hydraulic operating mechanism 1. Note that FIG. 1 also illustrates a circuit breaker contact 3 of the circuit breaker operated by the oil-hydraulic operating mechanism 1.

The oil-hydraulic operating mechanism 1 drives an operation unit 10 using hydraulic pressure maintained by an accumulator 11. The operation unit 10 controls opening and closing of the circuit breaker contact 3. The accumulator 11 is filled with nitrogen gas, which is a gas used for maintaining the hydraulic pressure. The oil and the nitrogen gas are separated from each other via a diaphragm in the accumulator 11. The accumulator 11 maintains the hydraulic pressure utilizing expansion and compression of the nitrogen gas.

A pump 12, which is an oil-hydraulic pump, supplies oil stored in an oil tank 13 through a pipe 18 into the accumulator 11, and thus performs a pressure-increasing operation to increase the hydraulic pressure maintained by the accumulator 11. The pump 12 starts a pressure-increasing operation when the maintained hydraulic pressure decreases to $P_{H1}$, and stops the pressure-increasing operation when the hydraulic pressure increases to $P_{H2}$. $P_{H1}$ is a first reference pressure, which is a criterion pressure value to start a pressure-increasing operation. $P_{H2}$ is a second reference pressure, which is a criterion pressure value to stop the pressure-increasing operation. Note that the first reference pressure is lower than the second reference pressure, and the relationship of $P_{H1}<P_{H2}$ is satisfied. An electric motor 14 drives the pump 12. A magnetic switch 5 switches the contact between an open position and a closed position by excitation and de-excitation to control turn-on and turn-off of the electric motor 14.

The oil maintained at a high pressure by the accumulator 11 is supplied through the pipe 18 to the operation unit 10. The channel for supplying the oil having the increased pressure from the pump 12 through the pipe 18 to the operation unit 10 is herein referred to as higher pressure channel. The oil having a pressure reduced by operation of the operation unit 10 is collected through a pipe 19 into the oil tank 13. The channel for returning the oil having the reduced pressure from the operation unit 10 through the pipe 19 back to the oil tank 13 is herein referred to as lower pressure channel.

An oil-hydraulic switch 15 is provided on the pipe 18 between the pump 12 and the accumulator 11. When the hydraulic pressure in the pipe 18 decreases to the preset value $P_{H1}$ during stop of the pump 12, the oil-hydraulic switch 15 instructs the magnetic switch 5 to excite. Excitation by the magnetic switch 5 causes the electric motor 14 to switch from an Off state to an On state, thereby causes the oil-hydraulic operating mechanism 1 to start a pressure-increasing operation performed by the pump 12. When the hydraulic pressure in the pipe 18 increases to the preset value of $P_{H2}$ during operation of the pump 12, the oil-hydraulic switch 15 instructs the magnetic switch 5 to de-excite. De-excitation by the magnetic switch 5 causes the electric motor 14 to switch from an On state to an Off state, thereby causes the oil-hydraulic operating mechanism 1 to stop the pressure-increasing operation performed by the pump 12.

A slow leak valve 17 is connected between the pipe 18 constituting a part of the higher pressure channel and the pipe 19 constituting a part of the lower pressure channel. The slow leak valve 17 leaks the oil in the pipe 18 to the pipe 19 at a very low rate. The slow leak provided by the slow leak valve 17 that leaks the oil allows the oil-hydraulic operating mechanism 1 to remove air bubbles introduced into the higher pressure channel, through the lower pressure channel into the oil tank 13. The oil-hydraulic operating mechanism 1 also uses the slow leak to suppress an increase in the hydraulic pressure caused by expansion of the nitrogen gas in the accumulator 11 due to an increase in the ambient temperature after the pressure increase.

The anomaly diagnosis device 2 will next be described. The operation of the pump 12 in association with operation of the circuit breaker is performed in a specific situation that requires an operation of the circuit breaker. The pump 12 not only operates in association with operation of the circuit breaker, but also operates to increase the hydraulic pressure that has decreased by a factor under normal operation. The slow leak is one of the factors under normal operation. The anomaly diagnosis device 2 subtracts the number of operations of the pump 12 in association with operation of the circuit breaker from the total number of operations of the pump 12 to obtain the number of operations of the pump 12 caused by the factor or factors under normal operation. The following description may refer to the number of operations of the pump 12 caused by the factor or factors under normal operation as normal-time number of operations. The following description may refer to the operation interval of the pump 12 caused by the factor or factors under normal operation as normal-time operation interval. Oil leakage from the pipe 18 and/or the pipe 19 in addition to the slow leak will increase the normal-time number of operations to compensate the decrease in the hydraulic pressure due to the oil leakage.

The anomaly diagnosis device 2 obtains the normal-time number of operations per unit time period. In the first embodiment, the unit time period is a preset time period, and is assumed to be one day. The unit time period may be a time period longer than one day, or may be a time period shorter than one day. The anomaly diagnosis device 2 corrects data of the normal-time number of operations per day based on the normal-time operation interval of the pump 12. The anomaly diagnosis device 2 collects the corrected data of the normal-time number of operations, and performs anomaly diagnosis of the oil-hydraulic operating mechanism 1 using the collected data.

The anomaly diagnosis device 2 includes: a first counter 21, which is a functional unit that counts the number of operations of the pump 12; a second counter 22, which is a functional unit that counts the number of operations of the circuit breaker; an operation determination unit 23, which is a functional unit that determines how the circuit breaker is operating; a timer 24, which is a functional unit that measures the operation interval of the pump 12; and an anomaly determiner 25, which is a functional unit that determines presence or absence of an anomaly in the oil-hydraulic operating mechanism 1.

The anomaly determiner 25 includes: a number-of-times detection unit 26, which is a functional unit that detects the number of operations of the pump 12 per unit time period; a correction unit 27, which is a functional unit that corrects the detected number of operations; and a statistical test unit 28, which is a functional unit that performs a statistical test on data of the number of operations. The anomaly determiner 25: corrects, based on the operation interval, the number of pressure-increasing operations obtained based on a result of counting by the first counter 21; and then determines presence or absence of an anomaly in the oil-hydraulic operating mechanism 1 using data of the corrected number of pressure-increasing operations.

The first counter 21 is a counter that counts the number of times of pressure-increasing operation performed by the pump 12, i.e., the number of pressure-increasing operations. The first counter 21 detects opening and closing of the magnetic switch 5 to count the total number of operations of the pump 12. Data of the number of operations obtained by the first counter 21 is sent to the number-of-times detection unit 26.

The operation interval measured by the timer 24 is the time period from when a pressure-increasing operation is stopped until a next pressure-increasing operation is started. The timer 24 detects the interval between closing and opening of the magnetic switch 5 to measure the operation interval. The timer 24 starts the measurement when the magnetic switch 5 transitions from a closed position to an open position, and stops the measurement when the magnetic switch 5 transitions from an open position to a closed position to measure the operation interval of the pump 12. Data of the operation interval obtained by the timer 24 is sent to the correction unit 27.

The second counter 22 detects opening and closing of an auxiliary contact 4 that indicates the open or closed position of the circuit breaker contact 3 to count the number of operations of the circuit breaker. Data of the number of operations obtained by the second counter 22 is sent to the number-of-times detection unit 26. The operation determination unit 23 determines whether the operation of the circuit breaker is operation related to a pressure increase caused by the pump 12 or operation not associated with a pressure increase caused by the pump 12, based on the opening and closing pattern of the auxiliary contact 4. The determination result of the operation determination unit 23 is sent to the number-of-times detection unit 26.

The circuit breaker is obliged to perform a set of operations including closing operation, opening operation, and opening operation immediately after closing, in a predetermined order and at predetermined intervals. Due to a series of continuous operations such as opening operation immediately after closing included in the operational tasks of the circuit breaker, a situation may arise in which the number of operations of the circuit breaker is counted, while the number of operations of the pump 12 is not counted because of no association with the operation of the pump 12. The number-of-times detection unit 26 can obtain the correct number of operations of the pump 12 in association with operation of the circuit breaker by subtracting the number of times of operation that has been determined, by the operation determination unit 23, not to be associated with a pressure increase provided by the pump 12, from the number of operations counted by the second counter 22. The number-of-times detection unit 26 subtracts the number of operations of the pump 12 per day in association with operation of the circuit breaker from the total number of operations of the pump 12 per day to obtain the normal-time number of operations of the pump 12 per day.

The correction unit 27 deletes the data corresponding to the operation of the pump 12 in association with operation of the circuit breaker, from the data of the operation interval obtained by the timer 24 to obtain the normal-time operation interval. The normal-time operation interval is the time period from when a pressure-increasing operation is stopped until a next pressure-increasing operation is started to increase the hydraulic pressure that has decreased by a factor under normal operation. The normal-time operation interval is also the time period from when the hydraulic pressure in the higher pressure channel increases to the value $P_{H2}$ by the pressure-increasing operation until the hydraulic pressure decreases from $P_{H2}$ to $P_{H1}$ by stopping of the pressure-increasing operation.

The correction unit 27 corrects the normal-time number of operations obtained by the number-of-times detection unit 26, based on the normal-time operation interval. This correction operation allows the correction unit 27 to remove the amount of the change in the number of operations resulting from a temperature variation, from the normal-time number of operations obtained by the number-of-times detection unit 26. The correction performed by the correction unit 27 enables the anomaly determiner 25 to determine presence or absence of an anomaly based on data of the number of pressure-increasing operations without an effect of temperature variation.

Figure 2:
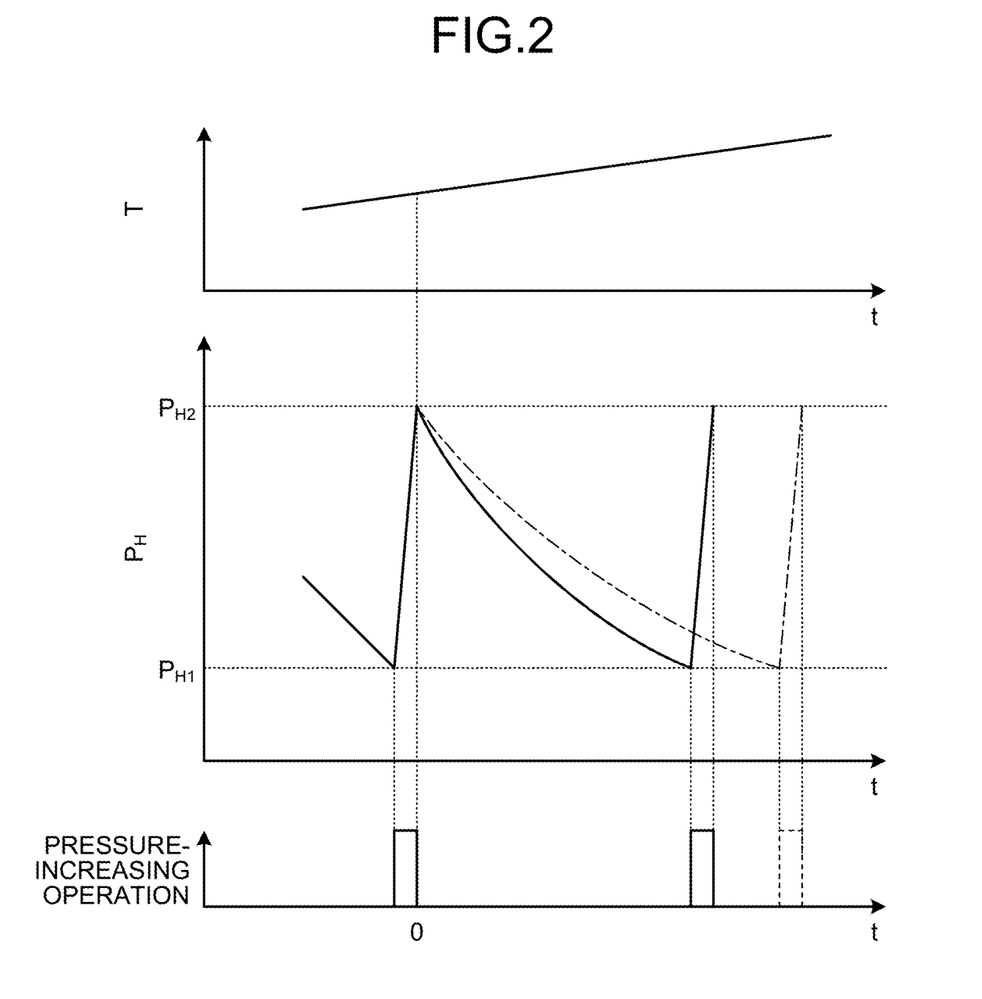
FIG. 2 is a diagram for describing a relationship among a change in hydraulic pressure in a higher pressure channel, operational timing of the pump, and the temperature, in the oil-hydraulic operating mechanism illustrated in FIG. 1.

A change in the number of operations of the pump 12 caused by a temperature variation will now be described. FIG. 2 is a diagram for describing a relationship among a change in the hydraulic pressure in the higher pressure channel, operational timing of the pump 12, and the temperature, in the oil-hydraulic operating mechanism 1 illustrated in FIG. 1. The temperature T is the temperature around the accumulator 11. FIG. 2 illustrates an example of relationship among the temperature T, the hydraulic pressure $P_H$ in the higher pressure channel, timing of the pressure-increasing operation, and the time t. As illustrated in the top section of FIG. 2, the temperature T increases over the time t along the time axis illustrated in FIG. 2.

In the middle section of FIG. 2, the relationship between the hydraulic pressure $P_H$ and the time in an ideal temperature condition having no change in the temperature T is illustrated by the dashed-and-dotted line; and the relationship between the hydraulic pressure $P_H$ and the time t when the temperature T changes as illustrated in the top section of FIG. 2 is illustrated by the solid line. It is assumed here that the initial value of the hydraulic pressure $P_H$ in the higher pressure channel, i.e., the hydraulic pressure $P_H$ at the time t=0, is $P_{H2}$. The bottom section of FIG. 2 illustrates the state in which the pressure-increasing operation is being performed by the pump 12, as a High level, and the state in which the pressure-increasing operation has been stopped, as a Low level.

An operation of the pump 12 of increasing the hydraulic pressure $P_H$ to $P_{H2}$ followed by an increase in the temperature T causes the nitrogen gas in the accumulator 11 to expand, which then changes the hydraulic pressure $P_H$. The change in the hydraulic pressure $P_H$ in turn causes the amount of leakage amount Q to change. In the case of an increase in the temperature T, the hydraulic pressure $P_H$ decreases from $P_{H2}$ to $P_{H1}$ more rapidly than when the temperature T does not change. Accordingly, in the case of an increase in the temperature T, the normal-time number of operations of the pump 12 per day is greater than that of when the temperature T does not change.

In an ideal temperature condition having no change in the temperature T, the leakage amount Q through the slow leak valve 17 is expressed by Equation (1) below. Note that the leakage amount Q and the hydraulic pressure $P_H$ in the higher pressure channel are values that change over the time t. A hydraulic pressure $P_L$ is the hydraulic pressure in the lower pressure channel. The hydraulic pressure $P_L$ in the lower pressure channel can be deemed to be constant considering the structure of the lower pressure channel. Thus, the hydraulic pressure $P_L$ is herein assumed to be a constant. The factor α is a factor determined based on the configuration of the slow leak valve 17 and on the configuration of the oil-hydraulic operating mechanism 1.

$$Q = \alpha \times (P_H - P_L) \quad (1)$$

In addition, the leakage amount Q decreases with a change in the hydraulic pressure $P_H$. The leakage amount Q has a characteristic proportional to the temporal derivative of the hydraulic pressure $P_H$. This yields Equation (2) below. In Equation (2), β is a proportionality factor.

[Formula 1]

$$Q = -\beta \frac{dP_H}{dt} \quad (2)$$

The equation obtained by substitution of Q of Equation (1) above with Equation (2) above is deformed, and then integration of both sides of the equation obtained by the deformation as expressed by Equation (3) results in Equation (4). In Equation (4), A is an integration constant.

[Formula 2]

$$\int \frac{1}{P_H - P_L} dP_H = -\frac{\alpha}{\beta} \int dt \quad (3)$$

$$\ln(P_H - P_L) = -\frac{\alpha}{\beta} t + A \quad (4)$$

Deformation of Equation (4) above yields Equation (5), and use of a notation $A' = e^A$ in Equation (5) results in Equation (6). Note that Equation (6) expresses the hydraulic pressure $P_H$ as a function $P_H(t)$ of the time t.

[Formula 3]

$$P_H - P_L = e^{-\frac{\alpha}{\beta}t + A} \quad (5)$$

$$P_H(t) = A' e^{-\frac{\alpha}{\beta}t} + P_L \quad (6)$$

Equation (6) above provides $P_H(0) = P_{H2}$ at the time t=0, and $P_H(\infty) = P_L$ at the time t=∞. Equation (6) provides $A' = P_{H2} - P_L$ at t=0, and use of this relationship in Equation (6) yields Equation (7). Then, use of a notation $\beta' = \beta/\alpha$ in Equation (7) results in Equation (8). β' is the decay time constant of the hydraulic pressure $P_H$. The hydraulic pressure $P_H$ in an ideal temperature condition having no change in the temperature T can be obtained by Equation (8).

[Formula 4]

$$P_H(t) = (P_{H2} - P_L) e^{-\frac{\alpha}{\beta}t} + P_L \quad (8)$$

$$P_H(t) = (P_{H2} - P_L) e^{-\frac{t}{\beta'}} + P_L \quad (9)$$

The hydraulic pressure $P_H$ in a case in which the temperature T changes will next be described. The leakage amount Q through the slow leak valve 17 is expressed by Equation (9) below, where δV is the amount of volume change of the nitrogen gas in the accumulator 11 caused by a change in the temperature T. In Equation (9), γ is a factor representing the relationship between the hydraulic pressure $P_H$ and the volume change amount δV.

$$Q = \alpha \times (P_H + \gamma \times \delta V - P_L) \quad (9)$$

In addition, the leakage amount Q decreases with a change in the hydraulic pressure $P_H$. The leakage amount Q has a characteristic proportional to the temporal derivative of the hydraulic pressure $P_H$. The temporal derivative of the term $\gamma \times \delta V$ in Equation (9) is expressed by Equation (10).

[Formula 5]

$$\frac{d(\gamma \times \delta V)}{dt} = \gamma \times \frac{dV}{dt} = \gamma \times \frac{dT}{dt} \times \frac{dV}{dT} \quad (10)$$

In Equation (10), the volume change rate with respect to temperature, dV/dT, is a constant uniquely specific to the gas. Thus, the temporal derivative of $\gamma \times \delta V$ is proportional to dT/dt, which is a change rate of the temperature with respect to time. The hydraulic pressure $P_H$ in the case in which the temperature T changes is expressed by Equation (11), where γ' represents the amount of change in the decay time constant β' due to the change in the temperature T.

[Formula 6]

$$P_H(t) = (P_{H2} - P_L) e^{-\frac{t}{\beta' + \gamma'}} + P_L \quad (11)$$

Figure 3:
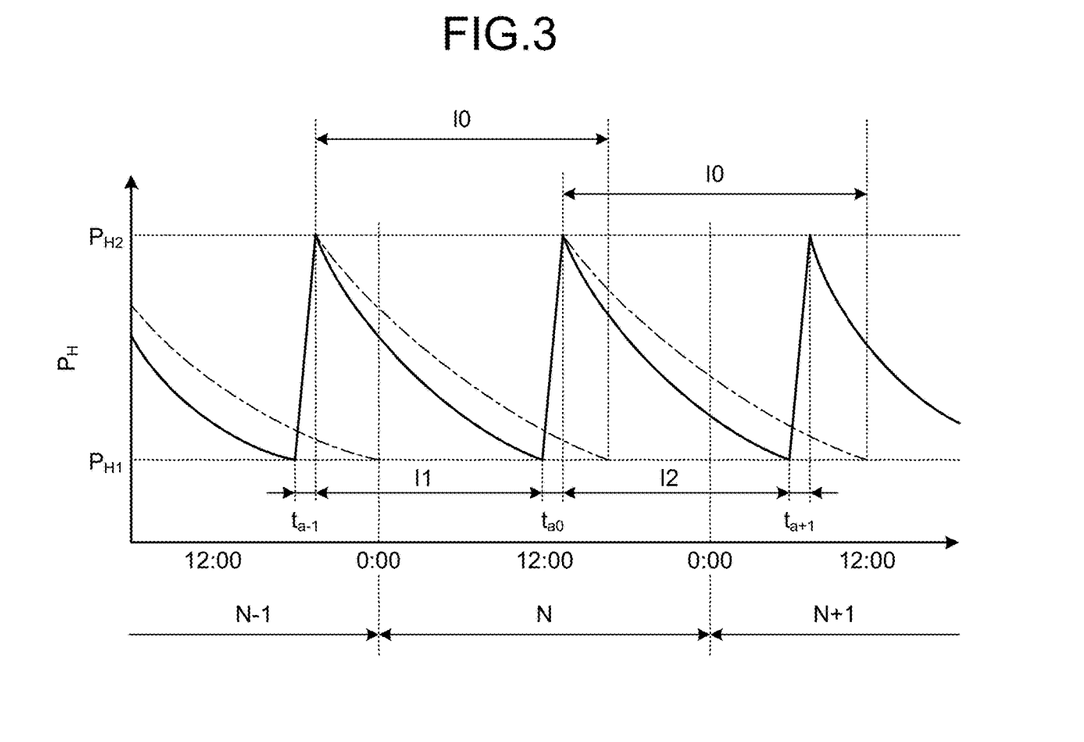
FIG. 3 is a diagram for describing correction of the number of operations of the pump in the anomaly determiner illustrated in FIG. 1.

FIG. 3 is a diagram for describing correction of the number of operations of the pump 12 performed in the anomaly determiner 25 illustrated in FIG. 1. In the graph illustrated in FIG. 3, the vertical axis represents the hydraulic pressure $P_H$ in the higher pressure channel, and the horizontal axis represents the time of day. FIG. 3 illustrates the relationship between the hydraulic pressure $P_H$ and the time of day in the ideal temperature condition having no change in the temperature T by the dashed-and-dotted line; and the relationship between the hydraulic pressure $P_H$ and the time of day in a case in which the temperature T changes by the solid line. The example illustrated in FIG. 3 assumes that the unit time period, i.e., one day, is a time period from midnight to midnight on the next day.

A description will now be provided of correction operation to the normal-time number of operations of the pump 12 during a time period from midnight on an arbitrary day, which is herein referred to as day N, to midnight on day (N+1), which is the next day of day N. In the example illustrated in FIG. 3, the pump 12 performs one pressure-increasing operation during a time period $t_{a0}$ included in the time period from midnight on day N to midnight on day (N+1). The number-of-times detection unit 26 detects "1" as the normal-time number of operations on day N. The pressure-increasing operation previous to the pressure-increasing operation performed during the time period $t_{a0}$ is performed during a time period $t_{a-1}$ on day (N−1), which is the previous day of day N. The pressure-increasing operation next to the pressure-increasing operation performed during the time period $t_{a0}$ is performed during a time period $t_{a+1}$ on day (N+1).

In the correction operation to the normal-time number of operations of the pump 12 on day N, the correction unit 27 obtains values of normal-time operation intervals I1 and I2 from the results of measurement performed by the timer 24. The normal-time operation interval I1 is a time period from the end of the time period $t_{a-1}$ to the beginning of the time period $t_{a0}$. The normal-time operation interval I2 is a time period from the end of the time period $t_{a0}$ to the beginning of the time period $t_{a+1}$. A standard operation interval I0 is defined as the interval of the pressure-increasing operation in the ideal temperature condition having no change in the temperature T. The anomaly determiner 25 obtains in advance, based on Equation (8) above, and using the correction unit 27, the standard operation interval I0, which is the time period t from when the hydraulic pressure $P_H$ has the value $P_{H2}$ until the hydraulic pressure $P_H$ reaches the value $P_{H1}$. The standard operation interval I0 is equivalent to the time t obtained by assigning $P_{H1}$ to $P_H(t)$ in Equation (8), and is obtained by Equation (12) below. Note that the decay time constant β' in Equation (8) and in Equation (12) is obtained experimentally in advance. The decay time constant β' may also be obtained theoretically.

[Formula 7]

$$I0 = \beta' \times \ln\frac{P_{H2} - P_L}{P_{H1} - P_L} \quad (12)$$

The correction unit 27 obtains the correction factor of I1/I0×I2/I0. The correction factor represents the ratio of the normal-time operation intervals I1 and I2 to the standard operation interval I0. The correction unit 27 divides "1" representing the normal-time number of operations detected by the number-of-times detection unit 26, by such correction factor. Thus, the correction unit 27 corrects the normal-time number of operations of the pump 12 based on the normal-time operation interval.

Note that in a case in which the normal-time number of operations in one day is more than one, the correction unit 27 corrects the number of operations based on the operation intervals of the respective pressure-increasing operations. The correction unit 27 obtains values of n+1 normal-time operation intervals I1, I2, . . . , and I(n+1) from results of measurement performed by the timer 24, where "n" represents the normal-time number of operations in one day, and "n" is an integer greater than or equal to 2. The correction unit 27 obtains the correction factor, which is I1/I0×I2/I0× . . . ×I(n+1)/I0. The correction unit 27 divides the normal-time number of operations by the correction factor.

Similar to the case for the normal-time number of operations on day N, the correction unit 27 corrects the normal-time number of operations of each day. Thus, the anomaly determiner 25 can obtain data of the number of pressure-increasing operations without an effect of temperature variation.

Note that the anomaly determiner 25 is also capable of correcting the number of operations of the pump 12 when the temperature T decreases similarly to when the temperature T increases. An operation of the pump 12 of increasing the hydraulic pressure $P_H$ to $P_{H2}$ followed by a decrease in the temperature T causes the nitrogen gas in the accumulator 11 to contract. In the case of a decrease in the temperature T, the hydraulic pressure $P_H$ decreases from $P_{H2}$ to $P_{H1}$ more slowly than when the temperature T does not change. Accordingly, in the case of a decrease in the temperature T, the normal-time number of operations of the pump 12 per day is less than that of when the temperature T does not change. The correction unit 27 is capable of correcting the number of operations of the pump 12 in both cases of an increase and a decrease in the temperature T.

The statistical test unit 28 collects data of the number of pressure-increasing operations that has been corrected in the correction unit 27. The statistical test unit 28 evaluates the variation in the number of pressure-increasing operations based on distribution of data during an evaluation period, which is a preset time period, and determines presence or absence of an anomaly in the oil-hydraulic operating mechanism 1. The first embodiment assumes that the evaluation period is one month. The evaluation period may be a time period longer than one month, or may be a time period shorter than one month.

The anomaly determiner 25 can recognize a long-term trend of variation in the number of pressure-increasing operations by evaluating the variation in the number of pressure-increasing operations based on distribution of data during the evaluation period. This enables the anomaly determiner 25 to detect a minor anomaly such as one difficult to be detected from raw data of the number of pressure-increasing operations, at an early stage in the occurrence of the anomaly. Examples of minor anomaly include a small amount of oil leakage and mixture of a small amount of air into oil.

Figure 4:
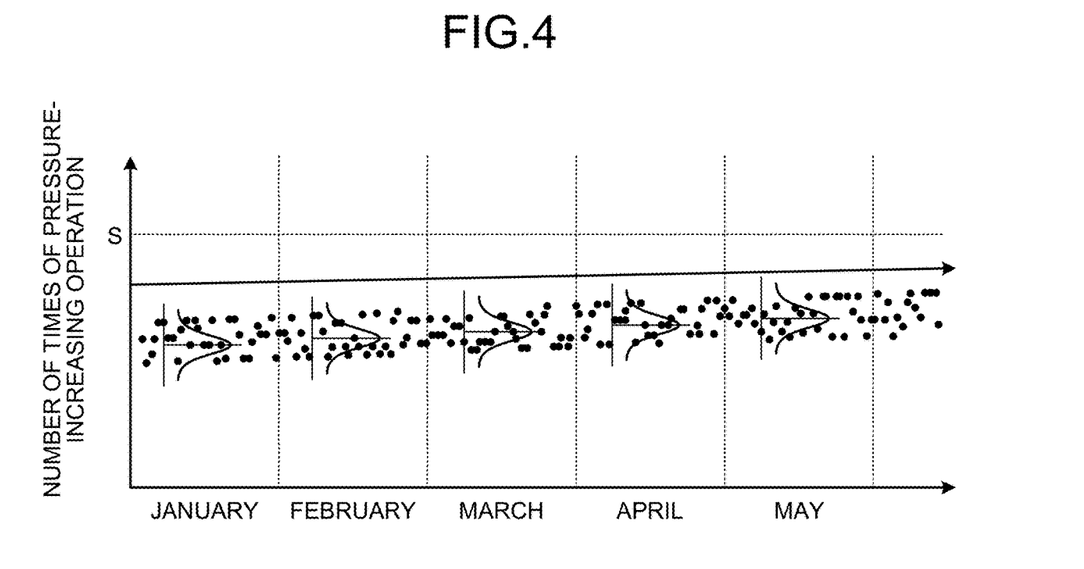
FIG. 4 is a diagram illustrating an example of distribution of data of the number of pressure-increasing operations collected in a statistical test unit illustrated in FIG. 1.

FIG. 4 is a diagram illustrating an example of distribution of the data of the number of pressure-increasing operations collected in the statistical test unit 28 illustrated in FIG. 1. The graph illustrated in FIG. 4 uses the horizontal axis to represent the time, and the vertical axis to represent the number of pressure-increasing operations, and plots the number of pressure-increasing operations per day having been corrected in the correction unit 27. In addition, a distribution curve representing the distribution of the number of pressure-increasing operations per month is also illustrated. The example illustrated in FIG. 4 assumes that the evaluation period is each month from January to May.

The data of the number of pressure-increasing operations input to the statistical test unit 28 does not include the data corresponding to the operation of the pump 12 in association with operation of the circuit breaker, which has been removed by the number-of-times detection unit 26. In addition, the data of the number of pressure-increasing operations input to the statistical test unit 28 has been corrected, by the correction unit 27, with respect to the amount of the change in the number of operations of the pump 12 caused by a temperature variation around the accumulator 11. The amounts corresponding to the changes in the number of operations in association with the circuit breaker and caused by a temperature change have been removed, and in a sense, normalized data is collected in the statistical test unit 28. The distribution of the number of pressure-increasing operations approximates to a normal distribution in each evaluation period. Exclusion of the amounts of the changes in the number of operations in association with the circuit breaker and caused by a temperature change allows the variance of the data of the number of pressure-increasing operations to be deemed as constant.

Note that, in the example illustrated in FIG. 4, the maximum value in the distribution of the number of pressure-increasing operations approaches, over time, an upper limit value S of the number of pressure-increasing operations. The upper limit value S is a threshold used as a criterion for determination in conventional anomaly determination, and is the number of pressure-increasing operations predicted as a value at which an anomaly causes leakage of a certain amount of oil. The anomaly determiner 25 is assumed to be capable of detecting an anomaly of the oil-hydraulic operating mechanism 1 at an early stage before the number of pressure-increasing operations reaches the upper limit value S.

The statistical test unit 28 evaluates the variation in the number of pressure-increasing operations using a statistical testing technique. In the first embodiment, the statistical test unit 28 uses a technique of t-test with respect to the difference between means, which is one of statistical testing techniques. T-test is a test using t distribution. The statistical test unit 28 determines whether a significant difference exists in the means of the numbers of pressure-increasing operations of a target month to be evaluated and of a reference month before the target month, thus to evaluate the variation in the number of pressure-increasing operations in the target month. The reference month is herein defined as the month when the anomaly diagnosis device 2 was put into operation, or a month when the oil-hydraulic operating mechanism 1 was inspected. The statistical test unit 28 may perform evaluation using a testing technique other than t-test.

Figure 5:
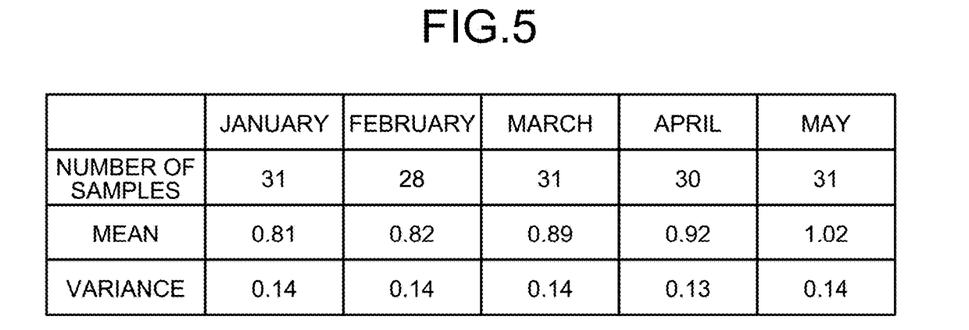
FIG. 5 is a chart illustrating an example of mean and variance values of the number of pressure-increasing operations in the data of the number of pressure-increasing operations collected in the statistical test unit illustrated in FIG. 1.

FIG. 5 is a chart illustrating an example of mean and variance values of the number of pressure-increasing operations in the data of the number of pressure-increasing operations collected in the statistical test unit 28 illustrated in FIG. 1. FIG. 5 lists the number of samples, the mean, and the variance in each month from January to May, which are each an evaluation period. The number of samples is the number of elements in the data in that evaluation period, and is the number of values of the number of pressure-increasing operations. In the example illustrated in FIG. 5, the number of samples is equivalent to the number of days of each month.

The statistical test unit 28 obtains the mean of the numbers of pressure-increasing operations in each of the evaluation periods, and the variance of the numbers of pressure-increasing operations in each of the evaluation periods. The deviation of the number of pressure-increasing operations can be obtained by subtracting the above mean from the value of the number of pressure-increasing operations.

Figure 6:
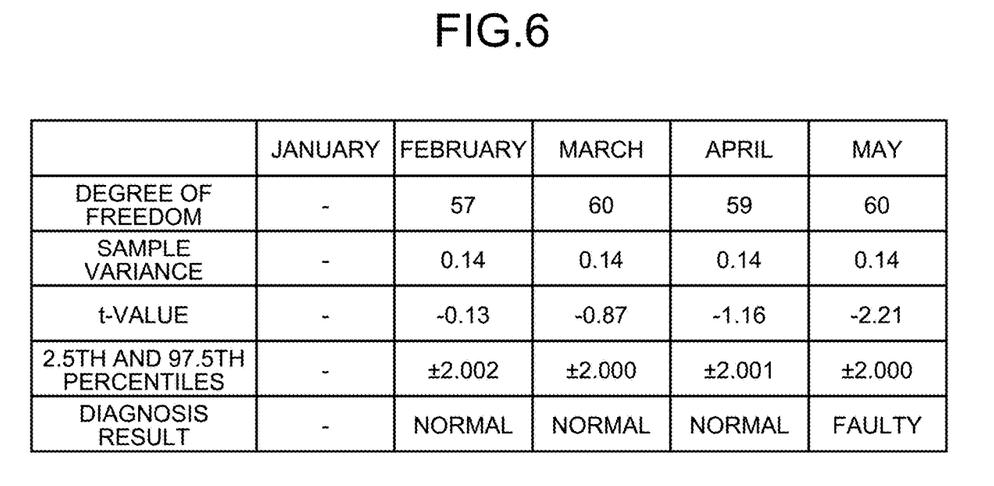
FIG. 6 is a chart illustrating an example of results of anomaly diagnosis performed by the statistical test unit illustrated in FIG. 1.

FIG. 6 is a chart illustrating an example of results of anomaly diagnosis performed by the statistical test unit 28 illustrated in FIG. 1. FIG. 6 illustrates an example of results of anomaly diagnosis based on the data of the number of pressure-increasing operations for each of the evaluation periods from January to May illustrated in FIG. 5. In such anomaly diagnosis, it is assumed that January is the reference month, and months from February to May are the target months.

The statistical test unit 28 tests whether the means of two sample groups differ significantly from each other assuming that the two sample groups each follow a normal distribution. The statistical test unit 28 determines whether the mean of a target month is stochastically identical to the mean of the reference month based on whether the t-value calculated based on the numbers of samples, the means, and the variances of the two sample groups falls within the range between 2.5th and 97.5th percentiles in the t distribution. The pair of 2.5th and 97.5th percentile points represents 5%, which is the probability at the significance level, based on which the statistical test unit 28 tests whether the mean of a target month and the mean of the reference month differ significantly from each other.

In the test of the difference between the means of two sample groups, the degree of freedom is calculated by subtracting 2 from the sum of the numbers of samples of both groups. The statistical test unit 28 calculates the degree of freedom by subtracting 2 from the sum of the number of samples of the target month and the number of samples of the reference month. The degree of freedom for the target month of February is calculated by subtracting 2 from the sum of the number of samples of January of "31" and the number of samples of February of "28" as "57". The sample variance illustrated in FIG. 6 is calculated by Equation (13) below. In Equation (13), $s^2$ represents the sample variance, $m_1$ represents the number of samples of the reference month, $m_2$ represents a number of samples of the target month, $s_1^2$ represents the variance of the reference month, and $s_2^2$ represents the variance of that target month.

[Formula 8]

$$s^2 = \frac{(m_1 - 1) \times s_1^2 + (m_2 - 1) \times s_2^2}{m_1 + m_2 - 2} \qquad (13)$$

The statistical test unit 28 calculates the t-values illustrated in FIG. 6 based on the numbers of samples, the means, and the sample variances of the target months and of the reference month. In Equation (14), t represents the t-value, $x_{av1}$ represents the mean of the reference month, and $x_{av2}$ represents the mean of the target month.

[Formula 9]

$$t = \frac{x_{av1} - x_{av2}}{\sqrt{s^2} \times \sqrt{\frac{1}{m_1} + \frac{1}{m_2}}} \qquad (14)$$

Whether a t-value falls within the range between 2.5th and 97.5th percentiles in the t distribution is determined by comparisons between the t-value and 2.5th and 97.5th percentiles. The statistical test unit 28 determines that the mean of the data of the number of pressure-increasing operations of the target month and the mean of the data of the number of pressure-increasing operations of the reference month differ significantly from each other if the t-value is greater than the positive value of the 2.5th and 97.5th percentiles, or if the t-value is less than the negative value of the 2.5th and 97.5th percentiles. In other words, if the t-value falls within the range from the negative value of 2.5th and 97.5th percentiles to the positive value of 2.5th and 97.5th percentiles, it is determined that there is no significant difference.

When February is the target month, 2.5th and 97.5th percentiles are "±2.002", which are 2.5th and 97.5th percentiles of t distribution having a degree of freedom of "57". Because the t-value of "−0.13" falls within the range from −2.002, which is the negative value of 2.5th and 97.5th percentiles, to 2.002, which is the positive value of 2.5th and 97.5th percentiles, the statistical test unit 28 determines that the means of the numbers of pressure-increasing operations do not differ significantly from each other for February and January. Accordingly, the statistical test unit 28 determines that the oil-hydraulic operating mechanism 1 is not faulty but normal. Also when March is the target month and when April is the target month, the statistical test unit 28 determines that the oil-hydraulic operating mechanism 1 is not faulty but normal as is determined when February is the target month.

When May is the target month, the t-value of "−2.21" does not fall within the range from −2.000, which is the negative value of 2.5th and 97.5th percentiles to 2.000, which is the positive value of 2.5th and 97.5th percentiles. Accordingly, the statistical test unit 28 determines that the means of the numbers of pressure-increasing operations differ significantly from each other for May and January. Thus, the statistical test unit 28 determines that the oil-hydraulic operating mechanism 1 is faulty. Note that in a case in which the anomaly diagnosis device 2 has been put into operation since January, there exists no data of the number of pressure-increasing operations before January. Thus, the anomaly diagnosis device 2 does not perform diagnosis for data of January as the target month. If there exists data of the number of pressure-increasing operations for the previous year, the anomaly diagnosis device 2 may perform diagnosis for data of January as the target month using the data of the reference month of the previous year.

Figure 7:
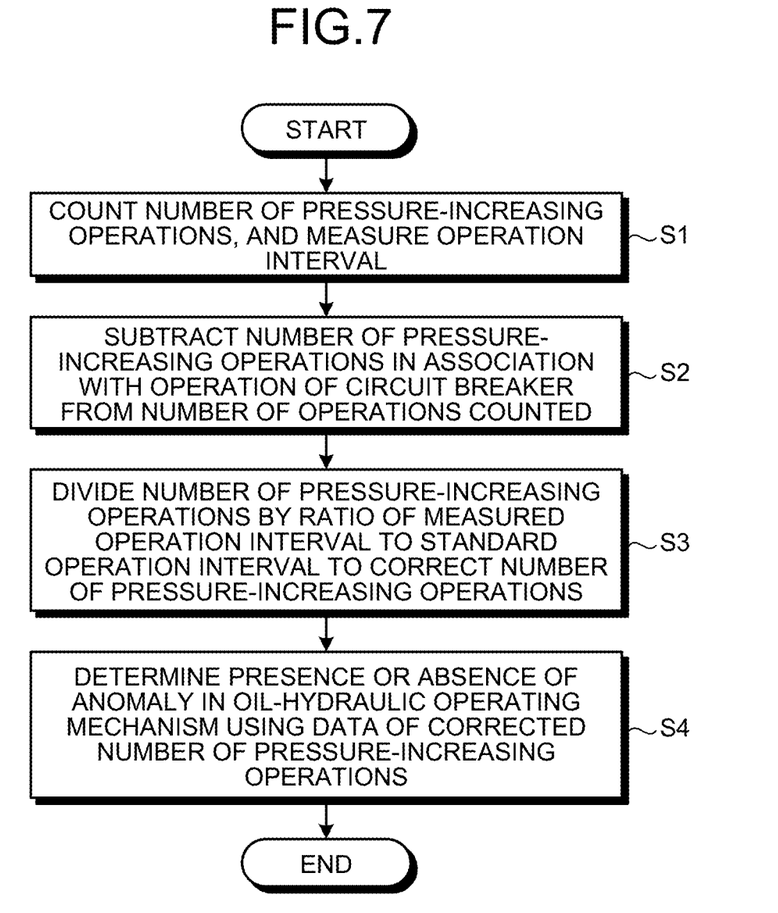
FIG. 7 is a flowchart illustrating a procedure of an anomaly diagnosis process performed by the anomaly diagnosis device illustrated in FIG. 1.

FIG. 7 is a flowchart illustrating a procedure of an anomaly diagnosis process performed by the anomaly diagnosis device 2 illustrated in FIG. 1. At step S1, the first counter 21 counts the number of operations of the pump 12, which is the number of pressure-increasing operations. The timer 24 measures the operation interval of the pump 12.

At step S2, the number-of-times detection unit 26 subtracts the number of pressure-increasing operations in association with operation of the circuit breaker from the number of operations counted at step S1, thus to detect the number of pressure-increasing operations that is the normal-time number of operations. In this process, the number-of-times detection unit 26 subtracts the number of operations determined in the operation determination unit 23 not to be associated with a pressure increase provided by the pump 12, from the number of operations counted by the second counter 22 thus to obtain the number of pressure-increasing operations in association with operation of the circuit breaker described above. At step S2, subtraction of the number of pressure-increasing operations in association with operation of the circuit breaker from the number of operations counted by the first counter 21 allows the anomaly determiner 25 to obtain data of the number of pressure-increasing operations without the amount of the change in the number of operations in association with the circuit breaker.

At step S3, the correction unit 27 divides the number of pressure-increasing operations obtained at step S2 by the correction factor to correct the number of pressure-increasing operations. The correction factor used in the correction at step S3 is a ratio of the operation interval measured at step S1 relative to the standard operation interval. The correction at step S3 allows the anomaly determiner 25 to obtain data of the number of pressure-increasing operations without the amount of the change in the number of operations caused by a temperature change.

At step S4, the statistical test unit 28 determines presence or absence of an anomaly in the oil-hydraulic operating mechanism 1 using the data of the number of pressure-increasing operations corrected at step S3. The anomaly diagnosis device 2 then terminates the anomaly diagnosis process.

Figure 8:
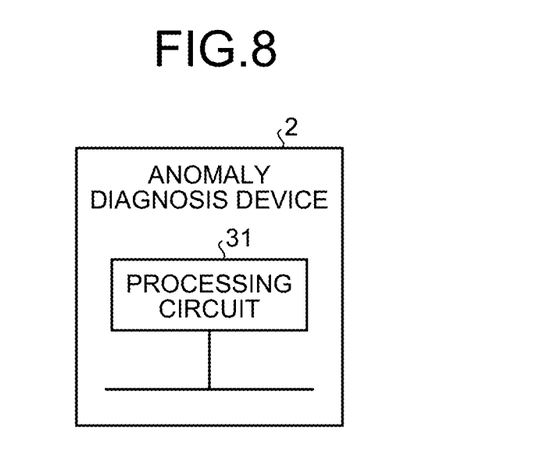
FIG. 8 is a configuration diagram of the anomaly diagnosis device in a case in which at least part of the functionality of the anomaly diagnosis device illustrated in FIG. 1 is implemented in a processing circuit.

At least part of multiple portions of the functionality of the first counter 21, the second counter 22, the operation determination unit 23, the timer 24, and the number-of-times detection unit 26, the correction unit 27, and the statistical test unit 28 of the anomaly determiner 25 is implemented in a processing circuit. FIG. 8 is a configuration diagram of the anomaly diagnosis device 2 in a case in which at least part of the functionality of the anomaly diagnosis device 2 illustrated in FIG. 1 is implemented in a processing circuit 31.

The processing circuit 31 is a dedicated hardware element of the anomaly diagnosis device 2. The processing circuit 31 is a single circuit, a set of multiple circuits, a programmed processor, a set of multiple programmed processors, an application specific integrated circuit (ASIC), a field-programmable gate array (FPGA), or a combination thereof. Some of the components of the anomaly diagnosis device 2 may be implemented in a dedicated hardware element provided separately from the other components of the anomaly diagnosis device 2.

Figure 9:
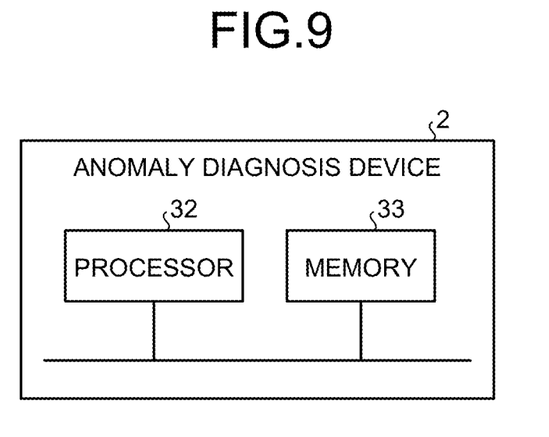
FIG. 9 is a configuration diagram of the anomaly diagnosis device in a case in which at least part of the functionality of the anomaly diagnosis device illustrated in FIG. 1 is implemented in a processor.

At least part of multiple portions of the functionality of the first counter 21, the second counter 22, the operation determination unit 23, the timer 24, and the number-of-times detection unit 26, the correction unit 27, and the statistical test unit 28 of the anomaly determiner 25 may be implemented in a processor that executes a program. FIG. 9 is a configuration diagram of the anomaly diagnosis device 2 in a case in which at least part of the functionality of the anomaly diagnosis device 2 illustrated in FIG. 1 is implemented in a processor 32.

The processor 32 executes a program stored in the memory 33. The processor 32 is a central processing unit (CPU), a processing unit, a computing unit, a microprocessor, a microcomputer, or a digital signal processor (DSP). At least part of the functionality of the first counter 21, the second counter 22, the operation determination unit 23, the timer 24, and the number-of-times detection unit 26, the correction unit 27, and the statistical test unit 28 of the anomaly determiner 25 is implemented in the processor 32 and in software, firmware, or a combination of software and firmware. The software or firmware is described as a program or programs, and is stored in the memory 33.

The processor 32 executes a program read from the memory 33 to implement the functionality of the components of the anomaly diagnosis device 2. The anomaly diagnosis device 2 performs the anomaly diagnosis process following the procedure illustrated in FIG. 7 by execution of a program or programs by the processor 32. A program stored in the memory 33 is a program that causes a computer to perform the anomaly diagnosis process that is to be performed by the components of the anomaly diagnosis device 2. The memory 33 is a non-volatile or volatile semiconductor memory such as a random access memory (RAM), a read-only memory (ROM), a flash memory, an erasable programmable read-only memory (EPROM), an electrically erasable programmable read-only memory (EEPROM) (registered trademark); a magnetic disk, a flexible disk, an optical disk, a compact disc, a MiniDisc, a digital versatile disk (DVD), or the like.

Multiple portions of the functionality of the first counter 21, the second counter 22, the operation determination unit 23, the timer 24, and the number-of-times detection unit 26, the correction unit 27, and the statistical test unit 28 of the anomaly determiner 25 may be implemented such that part of the multiple portions of the functionality is implemented in a dedicated hardware element, and the remainder of the multiple portions of the functionality is implemented in software or firmware. By way of example, the functionality of the first counter 21, the second counter 22, the operation determination unit 23, and the timer 24 may be implemented in a dedicated hardware element, and the number-of-times detection unit 26, the correction unit 27, and the statistical test unit 28 of the anomaly determiner 25 may be implemented in software or firmware. As described above, multiple portions of the functionality of the first counter 21, the second counter 22, the operation determination unit 23, the timer 24, and the number-of-times detection unit 26, the correction unit 27, and the statistical test unit 28 of the anomaly determiner 25 can be implemented in hardware, software, firmware, or a combination thereof.

According to the first embodiment, the anomaly diagnosis device 2 can collect data of the number of pressure-increasing operations corrected for the amount of the change in the number of pressure-increasing operations caused by a temperature variation, by performing, based on the operation interval, correction of the number of pressure-increasing operations obtained by the first counter 21. The anomaly diagnosis device 2 can thus evaluate the variation of the number of pressure-increasing operations based on the distribution of the data of the number of pressure-increasing operations, and can therefore detect an anomaly when the anomaly is still minor. Thus, the anomaly diagnosis device 2 is advantageous in being capable of detecting an anomaly of the oil-hydraulic operating mechanism 1 at an early stage.

The configuration described in the foregoing embodiment is merely an example of various aspects of the present invention. This configuration may be combined with a known other technology, and moreover, a part of such configuration may be omitted and/or modified without departing from the spirit of the present invention.

REFERENCE SIGNS LIST

1 oil-hydraulic operating mechanism; 2 anomaly diagnosis device; 3 circuit breaker contact; 4 auxiliary contact; 5 magnetic switch; 10 operation unit; 11 accumulator; 12 pump; 13 oil tank; 14 electric motor; 15 oil-hydraulic switch; 17 slow leak valve; 18, 19 pipe; 21 first counter; 22 second counter; 23 operation determination unit; 24 timer; 25 anomaly determiner; 26 number-of-times detection unit; 27 correction unit; 28 statistical test unit; 31 processing circuit; 32 processor; 33 memory.

The invention claimed is:

1. An anomaly diagnosis device for an oil-hydraulic operating mechanism, wherein the anomaly diagnosis device diagnoses, for anomaly, an oil-hydraulic operating mechanism that controls opening and closing of a circuit breaker, the anomaly diagnosis device comprising:

a counter to count a number of times of a pressure-increasing operation started upon a decrease in a hydraulic pressure maintained in the oil-hydraulic operating mechanism to a first reference pressure, and stopped upon an increase in the hydraulic pressure to a second reference pressure;

a timer to measure an operation interval that is a time period from when a pressure-increasing operation is stopped until a next pressure-increasing operation is started; and an anomaly determiner to correct, based on the operation interval, a number of pressure-increasing operations obtained based on a result of counting by the counter, and determine presence or absence of an anomaly in the oil-hydraulic operating mechanism using data of the number of pressure-increasing operations that has been corrected.

2. The anomaly diagnosis device for an oil-hydraulic operating mechanism according to claim 1, wherein the anomaly determiner obtains in advance a standard operation interval that is an interval of pressure-increasing operation under an ideal temperature condition, and divides the number of pressure-increasing operations by a ratio of the operation interval obtained by the timer to the standard operation interval to correct the number of pressure-increasing operations.

3. The anomaly diagnosis device for an oil-hydraulic operating mechanism according to claim 1, wherein the anomaly determiner collects the data of the number of pressure-increasing operations that has been corrected, and evaluates a variation in the number of pressure-increasing operations based on distribution of the data to determine the presence or absence of the anomaly.

4. The anomaly diagnosis device for an oil-hydraulic operating mechanism according to claim 3, wherein the anomaly determiner evaluates the variation in the number of pressure-increasing operations using a statistical testing technique.

5. The anomaly diagnosis device for an oil-hydraulic operating mechanism according to claim 1, wherein the anomaly determiner corrects, based on the operation interval, the number of pressure-increasing operations obtained by subtraction of a number of pressure-increasing operations in association with operation of the circuit breaker from the result of counting by the counter.

6. The anomaly diagnosis device for an oil-hydraulic operating mechanism according to claim 5, wherein the anomaly determiner subtracts a number of operations determined not to be associated with the pressure-increasing operation in the oil-hydraulic operating mechanism, from a number of operations of the circuit breaker to obtain the number of pressure-increasing operations in association with operation of the circuit breaker.

7. An anomaly diagnosis method for an oil-hydraulic operating mechanism, being an anomaly diagnosis method for diagnosing, for anomaly, an oil-hydraulic operating mechanism that controls opening and closing of a circuit breaker, the anomaly diagnosis method comprising:
- counting a number of times of a pressure-increasing operation started upon a decrease in a hydraulic pressure maintained in the oil-hydraulic operating mechanism to a first reference pressure, and stopped upon an increase in the hydraulic pressure to a second reference pressure;
- measuring an operation interval that is a time period from when a pressure-increasing operation is stopped until a next pressure-increasing operation is started;
- correcting, based on the operation interval, a number of pressure-increasing operations obtained based on a result of the counting; and
- determining presence or absence of an anomaly in the oil-hydraulic operating mechanism using data of the number of pressure-increasing operations that has been corrected.

* * * * *